United States Patent
Nomura et al.

(10) Patent No.: US 6,722,335 B2
(45) Date of Patent: Apr. 20, 2004

(54) VEHICLE INTAKE MANIFOLDS

(75) Inventors: Kazuhisa Nomura, Obu (JP); Satoshi Hattori, Obu (JP)

(73) Assignee: Aisan Kogyo Kabushiki Kaisha, Aichi-Ken (JP)

( * ) Notice: Subject to any disclaimer, the term of this patent is extended or adjusted under 35 U.S.C. 154(b) by 0 days.

(21) Appl. No.: 10/315,933

(22) Filed: Dec. 11, 2002

(65) Prior Publication Data

US 2003/0111036 A1 Jun. 19, 2003

(30) Foreign Application Priority Data

Dec. 19, 2001 (JP) ........................ 2001-385417

(51) Int. Cl.$^7$ ............................... F02M 35/10
(52) U.S. Cl. ............. 123/184.59; 251/306; 123/184.36
(58) Field of Search .................. 123/184.53, 184.59, 123/184.55, 184.56; 251/306

(56) References Cited

U.S. PATENT DOCUMENTS

2002/0152982 A1 * 10/2002 Pietrowski et al. .... 123/184.56

* cited by examiner

Primary Examiner—Andrew M. Dolinar
Assistant Examiner—Katrina Harris
(74) Attorney, Agent, or Firm—Dennison, Schultz, Dougherty & MacDonald

(57) ABSTRACT

Air intake manifolds (32) for vehicle engines (50) may include a plate-shaped short runner valve (16) that is rotatably disposed within an aperture (19) of a wall partition (42). The valve (16) may be operated to open and close the aperture. A flange (22) may extend from an inner surface of the aperture and the flange may define a sealing face (22*b*). An elastic sealing member (21) may be disposed along a peripheral edge of the valve. The sealing member may include first and second projections (21*a*, 21*b*) extending from the peripheral edge of the valve. The first and second projections may be arranged in a substantially V-shape. Further, the terminal ends of the first and second projections are preferably disposed so as to closely contact the sealing face when the valve is rotated to the closed position.

10 Claims, 5 Drawing Sheets

Prior ART

VEHICLE INTAKE MANIFOLDS

CROSS-REFERENCE

This application claims priority to Japanese patent application serial number 2001-385417, the contents of which are hereby incorporated by reference as if fully set forth herein.

BACKGROUND OF THE INVENTION

1. Technical Field

The present teachings relate to intake manifolds for vehicles and more particularly, relate to techniques for improving the airtight seal of a short runner valve when the short runner valve is disposed in a closed position within the plenum of the intake manifold.

2. Description of the Related Art

Known intake manifolds include an air passage or plenum defined within the intake manifold and one or more short runner valves that are rotatably disposed within the air passage. The short runner valves rotate or pivot between an opened position and a closed position within the air passage. In some applications, the short runner valve may be required to tightly close or seal the air passage when the valve is disposed in the closed position. The short runner valve(s) may be utilized to adjust the tuning of the intake system over a wide range of engine speeds in order to deliver the appropriate amount of airflow to the combustion chambers (cylinders) of the vehicle engine and increase engine torque. That is, the short runner valves can be opened and closed to provide a supercharging or turbo effect and optimize engine torque output for a wide range of engine speeds. However, if air leaks through the short runner valve when the short runner valve is disposed in the closed position, the desired tuning can not be achieved and engine performance will suffer. Thus, it is a long felt-need to develop short runner valves that can reliably seal the air passage during operation of the intake manifold.

Japanese Laid-Open Patent Publication No. 7-279696 discloses a technique for increasing the airtight seal of a valve. As shown in FIG. 5, the known valve 51 includes rubber seals 52, 53 that are affixed to the respective outer edges of valve 51. Body (plenum) 56 defines aperture 57 and the valve 51 is pivotably disposed within aperture 57. In addition, body 56 defines sealing faces 54, 55. FIG. 5 shows the state in which valve 51 is disposed in the closed position with respect to aperture 57. Further, aperture 57 is opened when valve 51 is pivoted or rotated counterclockwise from the closed position.

If positive pressure is applied to the valve 51 in the direction shown by arrows 58, 59 when valve 51 is disposed in the closed position, the positive pressure presses sealing members 52, 53 against the respective sealing faces 54, 55. Thus, sealing members 52, 53 effectively prevent air leaks through aperture 57 and the known valve 51 can realize an airtight seal under this condition.

However, if positive pressure is applied to valve 51 in the direction of arrows 60, 61 (i.e., in the direction that is opposite of arrows 58, 59), sealing members 52, 53 will be forcibly separated from the respective sealing faces 54, 55 by the applied pressure and air will leak through aperture 57. Therefore, the known valve 51 can only ensure an airtight seal for pressure applied to one side of valve 51 and air may be caused to leak through aperture 57 when positive pressure is applied to the opposite side of valve 51.

SUMMARY OF THE TEACHINGS

Accordingly, it is one object of the present teachings to provide valves that maintain a substantially airtight seal regardless of the direction in which positive pressure is applied to the valve.

In one aspect of the present teachings, air intake manifolds may include a body or plenum and an air passage defined within the body. A sealing face may be defined on a flange that projects into an aperture defined within a partition wall. The air intake manifolds may further include at least one short runner valve (or SRV) that is disposed within the aperture such that the SRV can be pivoted or rotated between an opened position and a closed position. An elastic sealing member may be affixed to the periphery (e.g., peripheral edge) of the SRV. The sealing member may include a first portion that presses against (contacts) the sealing face when pressure is applied to one side of the closed SRV. The sealing member also may include a second portion that presses against (contacts) the sealing face when pressure is applied to the opposite side of the closed SRV. Thus, at least one sealing portion will be pressed against the sealing face regardless of the direction of the applied pressure, thereby providing a reliable airtight seal under all operating conditions.

In another aspect of the present teachings, the SRV may be substantially plate-shaped and the elastic sealing member may be affixed or attached to a peripheral edge of the plate-shaped valve. The first and second portions of the sealing member may be first and second projections that extend or project from the periphery of the plate-shaped valve. The first and second projections may form a substantially V-shape in cross section and the V-shaped opening preferably faces the sealing face. When the plate-shaped valve is rotated towards the closed position, the V-shaped projections will closely contact the sealing face regardless of which direction that pressure is being applied to the SRV.

That is, when positive pressure is applied to one side of the plate-shaped valve, the first projection will be pressed against the sealing face. On the other hand, when positive pressure is applied to the opposite side of the valve, the second projection will be pressed against the sealing face. Therefore, reliable airtight seals may be ensured for the SRV in both directions that pressure may be applied to the SRV.

DETAILED DESCRIPTION OF THE TEACHINGS

A representative short runner valve 16 according to the present teachings will hereinafter be described with reference to FIGS. 1 to 4.

Figure 1:
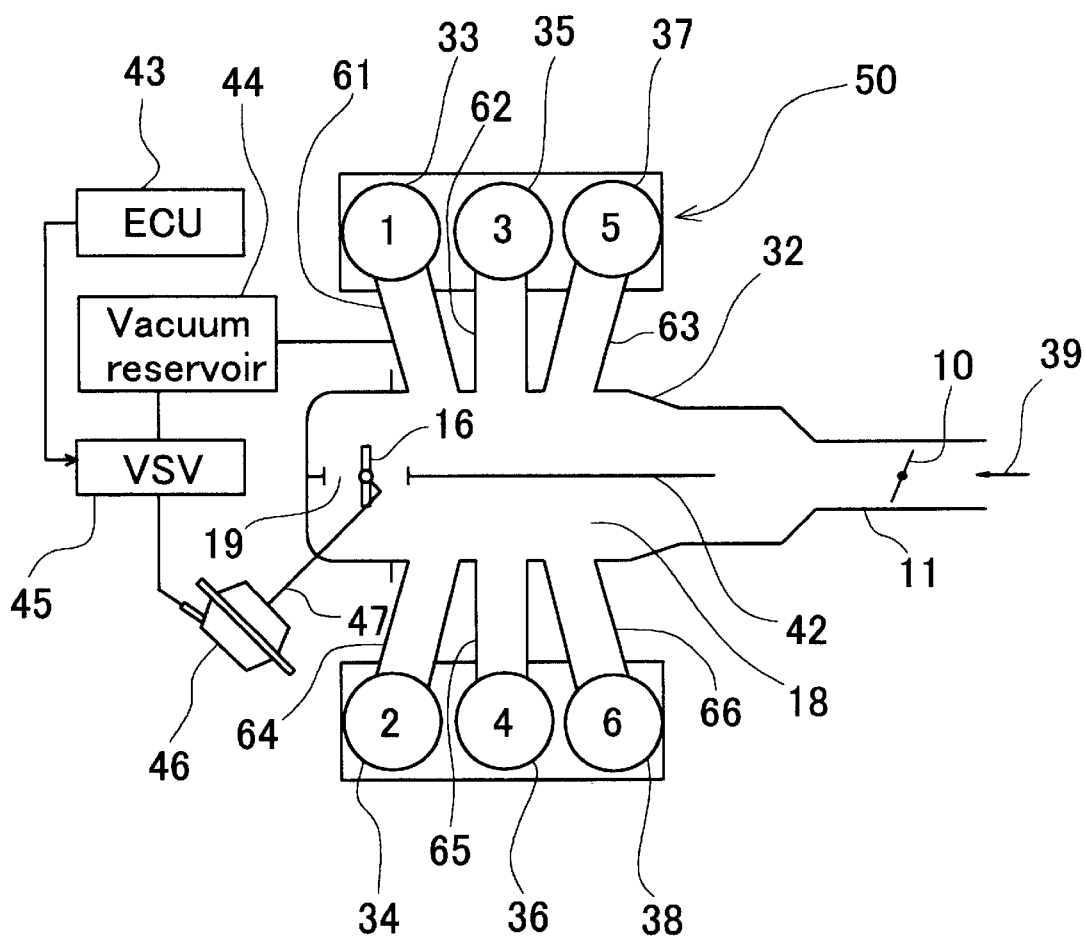
FIG. 1 schematically shows a representative engine intake manifold.

As shown in FIG. 1, throttle valve 10 is disposed within throttle body 11 and throttle body 11 communicates with an inlet of an intake manifold 32 for vehicle engine 50. Throttle valve 10 may be rotated or pivoted in order to control the amount of intake air 39 that flows into the intake manifold 32. In this representative embodiment, engine 50 is a V-6 engine (i.e., the six cylinders are arranged in a V configuration), although the present teachings are naturally applicable to a wide variety of engine designs having greater or less than 6 cylinders. Intake air 39 preferably flows into intake manifold 32 via an air filter (not shown) from a point upstream of intake manifold 32. First cylinder (combustion chamber) 33, second cylinder 34, third cylinder 35, fourth cylinder 36, fifth cylinder 37, and sixth cylinder 38 of engine 50 communicate with the downstream portion of intake manifold 32 via six respective intake pipes or runners 61–66. Further, intake manifold 32 includes partition wall 42 that divides the interior of intake manifold 32 into two portions (or two plenums). One divided portion corresponds to first cylinder 33, third cylinder 35, and fifth cylinder 37 and the other divided portion corresponds to second cylinder 34, fourth cylinder 36, and sixth cylinder 38.

Vacuum reservoir 44 may be coupled to intake pipe 61, which communicates with first cylinder 33. In addition, vacuum reservoir 44 may be coupled to VSV (vacuum switching valve) 45. Further, VSV 45 may be coupled to actuator (e.g., a diaphragm) 46. VSV 45 may be controlled by electric signals supplied from ECU (engine control unit) 43 in order to adjust the amount of negative or reduced pressure (driving pressure) that is communicated from vacuum reservoir 44 to actuator 46. Actuator 46 extends or retracts rod 47 in accordance with the pressure that is communicated by VSV 45.

Aperture 19 is defined within partition wall 42. Short runner valve 16 is rotatably disposed within aperture 19 and short runner valve 16 cooperates with partition wall 42 in order to open and close aperture 19. Rod 47 is connected to short runner valve 16. Therefore, when negative pressure is generated within first intake pipe 61 by air being drawn into first cylinder 33 through first intake pipe 61, the negative pressure is transmitted to and averaged by vacuum reservoir 44. The averaged negative pressure is then transmitted to VSV 45 and VSV 45 transmits an appropriate driving (negative) pressure to actuator 46 in accordance with signals from ECU 43. Consequently, rod 47 can be appropriately extended/retracted in order to open/close short runner valve 16.

In such an engine induction system, intake pressure will oscillate at particular engine speed ranges. This pressure oscillation occurs when a resonance frequency that is determined by the capacities, lengths, etc of intake manifold 32, intake pipes 61–66 and intake air introducing tube, which are disposed farther upstream for intake manifold 32, matches an excitation vibration frequency that is generated by drawing air into cylinders 33–38. When the intake pressure of the induction system increases, a supercharging or turbo effect enables the engine output (torque) to be increased. When short runner valve 16 is opened, the two divided interiors of intake manifold 32 are permitted to communicate with each other and the capacity or effective volume of intake manifold 32 (i.e., the plenum) relative to cylinders 33–38 is increased. On the other hand, when short runner valve 16 is closed, the capacity or effective volume of the plenum is reduced. When the capacity or effective volume of intake manifold 32 relative to cylinders 33–38 changes, the resonance frequency also changes. Accordingly, by appropriately opening and closing short runner valve 16, e.g., by changing the resonance frequency in accordance with the excitation frequencies of the engine vibrations, the engine output (i.e., torque output) can be increased over a wide range of engine speeds.

Figure 2:
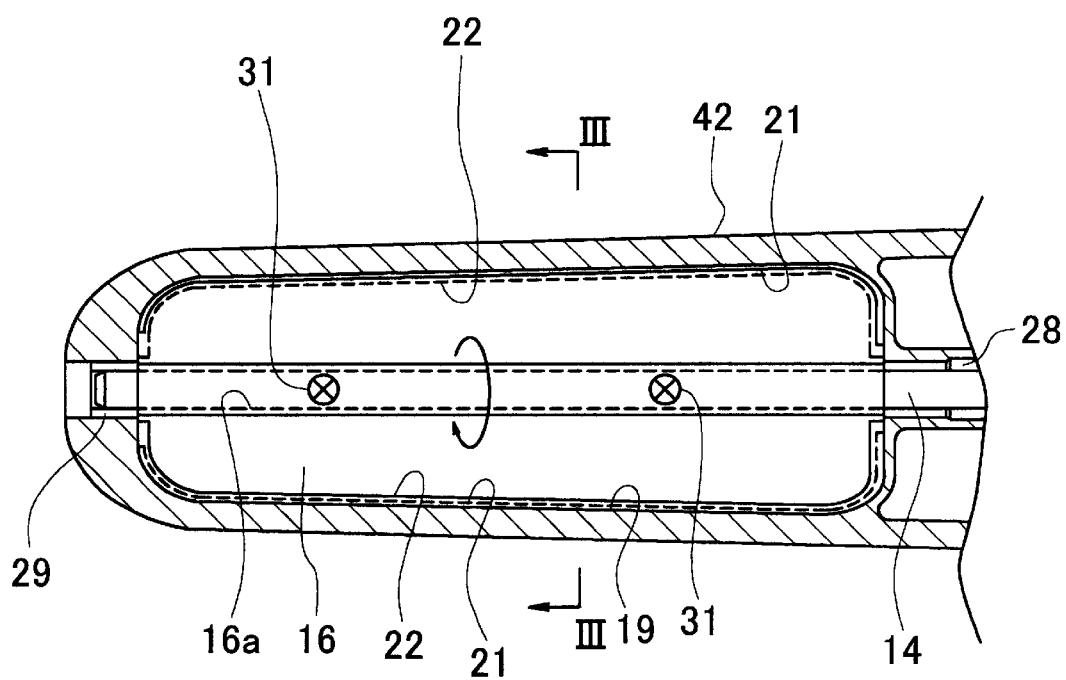
FIG. 2 is a plan view showing a representative short runner valve disposed in the closed position.
Figure 3:
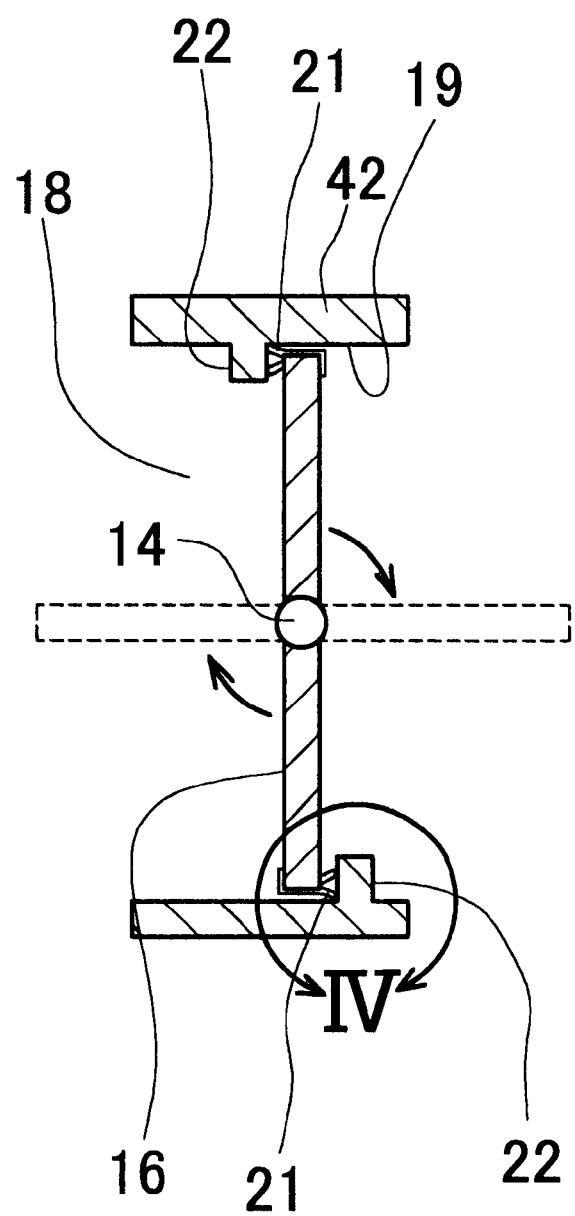
FIG. 3 is a cross-sectional view taken along line III—III shown in FIG. 2.

As shown in FIGS. 2 and 3, short runner valve 16 is disposed within aperture 19 of partition wall 42. Short runner valve 16 is affixed to shaft 14 by screws 31 and shaft 14 rotates within aperture 19. In FIG. 3, short runner valve 16 in the completely closed state is shown.

Figure 4:
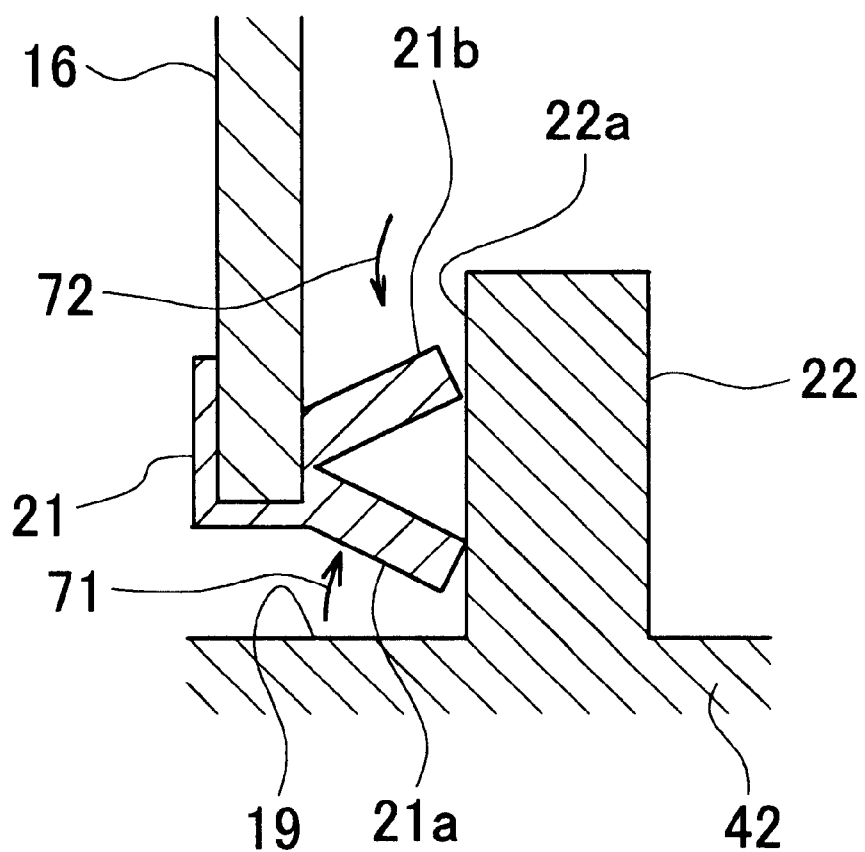
FIG. 4 is an enlarged view of the portion within circle IV shown in FIG. 3, in which a sealing member closely contacts a sealing face.
Figure 5:
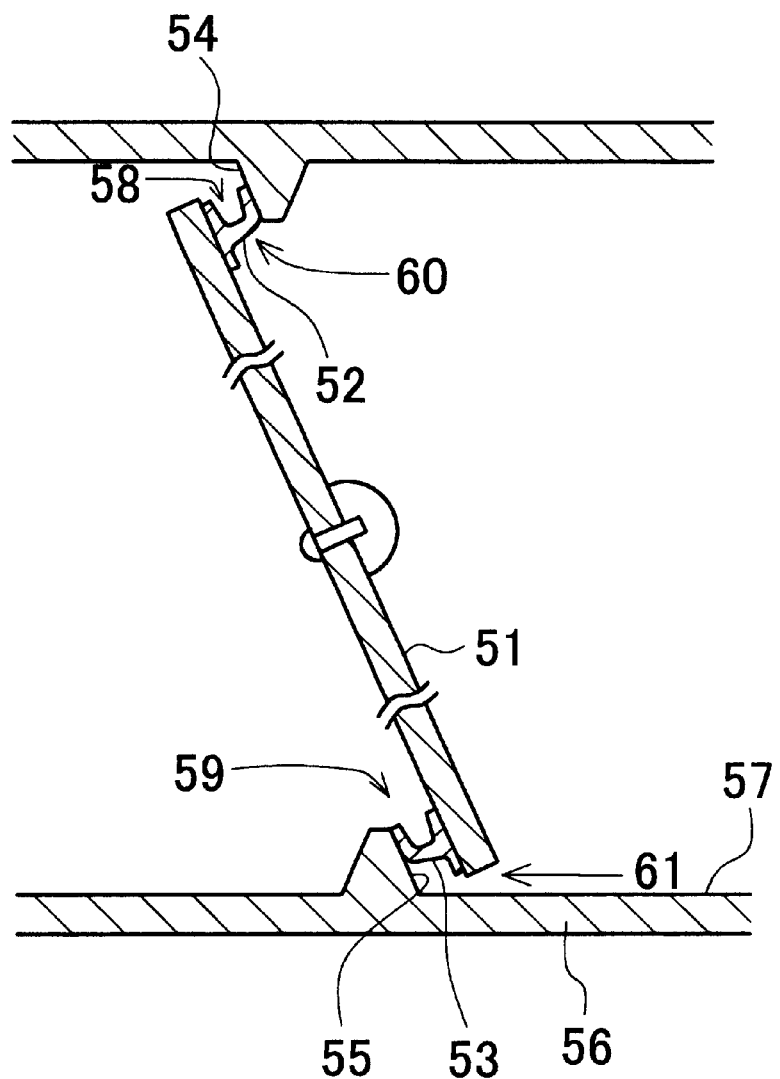
FIG. 5 is a cross-sectional view showing a known short runner valve when a sealing member closely contacts a sealing face.

Referring to FIG. 2, aperture 19 may have, e.g., a substantially rectangular cross-section within partition wall 42. In addition, as schematically shown in FIG. 3, flange 22 preferably extends from the inner surface of aperture 19 by a suitable distance. Flange 22 may be divided into upper and lower portions such that the upper portion is disposed on one side of shaft 14 and valve 16 and the lower portion is disposed on the opposite side of shaft 14 and valve 16. The left side of FIG. 3 corresponds to one side of shaft 14 and valve 16 and the right side of FIG. 3 corresponds to the opposite side of shaft 14 and valve 16. As shown in FIG. 4, flange 22 defines sealing face 22a and elastic sealing member 21 (which will be further described below) will firmly press against sealing face 22a during operation of engine 50.

Referring back to FIG. 2, rod-shaped shaft 14 may be supported by two support members (bearings) 28, 29 that are affixed to partition wall 42. Thus, shaft 14 can pivot or rotate about bearings 28, 29. Short runner valve 16 is preferably substantially rectangular so as to correspond to the cross-sectional shape of aperture 19. In addition, longitudinal opening 16a is defined through valve 16 and shaft 14 may be mounted through opening 16a.

Referring to FIG. 4, elastic sealing member 21 may be made, e.g., of rubber, and may be attached to the perimeter (peripheral edge) of short runner valve 16. Sealing member 21 preferably includes first and second projections 21a, 21b that extend along the perimeter of valve 16. When viewed together, first and second projections 21a, 21b preferably extend in a substantially V-shape. Further, the V-shaped opening formed by first and second projections 21a, 21b preferably faces sealing face 22a so as to closely and firmly contact sealing face 22a when valve 16 is closed. That is, when short runner valve 16 is pivoted to the fully closed position, the terminal edges of first and second projections 21a, 21b will closely contact sealing face 22a of flange 22 in order to seal or close aperture 19.

During operation of engine 50, cylinders 33–38 will intake or draw in air according to a predetermined order. If aperture 19 is tightly closed or sealed by short runner valve 16, positive pressure will alternately be applied to the respective sides of short runner valve 16. Thus, when positive pressure is applied in the direction of arrow 71 to sealing member 21, first projection 21a will firmly press against sealing face 22a in order to provide a reliable air tight seal. On the other hand, when positive pressure is applied in the direction of arrow 72, second projection 21b will be firmly pressed against sealing face 22a in order to provide a reliable air tight seal.

As was described above, sealing member 21 includes first and second projections 21a, 21b that are disposed in substantially a V-shape. Therefore, regardless of which direction that positive pressure is applied to valve 16, either first projection 21a or second projection 21b will be firmly pressed against sealing face 22a in order to maintain a reliable airtight seal.

Each of the features and method steps disclosed above and below may be utilized separately or in conjunction with other features, elements and method steps to provide improved intake manifolds and techniques for providing reliable air tight seals within the intake manifolds. The detailed representative example of the present teachings, which was described above, utilizes many of these additional features and method steps in conjunction. However, this detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the above detailed description may not be necessary to practice the present teachings in the broadest sense, and are instead taught merely to particularly describe representative and preferred embodiments of the present teachings. Of course, features and steps described in this specification and in the dependent claims may be combined in ways that are not specifically enumerated in order to achieve other usual and novel embodiments of the present teaching s and the present inventor expressly contemplates such additional combinations.

For example, although only a single short runner valve 16 was described in the representative embodiment for the purpose of clarity, two or more short runner valves 16 may be utilized and thus, two or more apertures 19 may be defined within partition wall 42. Further, the cross-section of first and second projections 21a, 21b of sealing member 21 is not required to have a V-shape and instead, the first and second projections 21a, 21b may have a substantially curved cross-section. Furthermore, a groove may also be formed along the periphery of valve 16.

What is claimed is:

1. An air intake manifold (32) comprising:
   a partition wall (42) dividing an air passage (18) into two portions, wherein at least one aperture (19) is defined within the partition wall,
   a valve (16) rotatably disposed within the at least one aperture and being rotatable between an opened position and a closed position,
   a flange (22) extending from a side wall of the aperture, the flange defining a sealing face (22a) that is arranged and constructed to closely contact a peripheral edge of the valve when the valve is disposed in the closed position, and
   an elastic sealing member (21) affixed to the peripheral edge of the valve, the sealing member comprising a first portion (21a) arranged and constructed to press against the sealing face when the valve is disposed in the closed position and positive pressure is applied to one side of the valve, and a second portion (21b) arranged and constructed to press against the sealing face when the valve is disposed in the closed position and positive pressure is applied to an opposite side of the valve.

2. An air intake manifold as in claim 1, wherein the first and second portions are arranged in a substantially V-shape.

3. An air intake manifold as in claim 1, further comprising a plurality of apertures (19) defined within the partition wall and a plurality of valves (16) rotatably disposed within the respective apertures.

4. An air intake manifold as in claim 1, further comprising an intake pipe (61) in communication with the air passage, a vacuum source (44) in communication with the intake pipe, a vacuum switching valve (45) in communication with the vacuum source and an ECU, an actuator (46) being controlled by the vacuum switching valve and a rod (47) being coupled between the actuator and the valve.

5. An air intake manifold as in claim 4, wherein the first and second portions are arranged in a substantially V-shape.

6. An air intake manifold as in claim 5, further comprising a plurality of apertures (19) defined within the partition wall and a plurality of valves (16) rotatably disposed within the respective apertures.

7. An apparatus (32) comprising:
   an aperture (19) defined within a partition wall (42), the partition wall separating an air passage into two portions within the apparatus,
   a flange (22) extending from an inner surface of the aperture, the flange defining a sealing face (22a),
   a plate-shaped valve (16) rotatably disposed within the aperture and being arranged and constructed to open and close the aperture, and
   an elastic sealing member (21) disposed along a peripheral edge of the valve, the sealing member including first and second projections (21a, 21b) extending from the peripheral edge of the valve, wherein the first and second projections are arranged in a substantially V-shape and terminal ends of the first and second projections are disposed so as to closely contact the sealing face when the valve closes the aperture.

8. An apparatus as in claim 7, wherein the first and second projections are arranged such that the first projection closely contacts the sealing face when positive pressure is applied to a first side of the valve and the second projection closely contacts the sealing face when positive pressure is applied to a second side of the valve.

9. An apparatus as in claim 7, further comprising a plurality of apertures (19) defined within the partition wall and a plurality of valves (16) rotatably disposed within the respective apertures.

10. An apparatus as in claim 7, further comprising an intake pipe (61) in communication with the air passage, a vacuum source (44) in communication with the intake pipe, a vacuum switching valve (45) in communication with the vacuum source and an ECU, an actuator (46) being controlled by the vacuum switching valve and a rod (47) being coupled between the actuator and the valve.

* * * * *